United States Patent [19]
Dujari et al.

[11] Patent Number: 4,811,124
[45] Date of Patent: Mar. 7, 1989

[54] DEFECT SKIPPING MECHANISM FOR DISK DRIVES

[75] Inventors: Vineet Dujari, Sunnyvale; Nicos S. Syrimis; Douglas G. Gray, both of Santa Clara, all of Calif.

[73] Assignee: Advanced Micro Devices, Inc., Sunnyvale, Calif.

[21] Appl. No.: 77,252

[22] Filed: Jul. 24, 1987

[51] Int. Cl.[4] .................. G11B 27/00; G11B 20/12
[52] U.S. Cl. ......................... 360/49; 369/59; 369/54
[58] Field of Search .............. 369/59; 360/48, 49, 360/53, 63, 39, 31, 54, 58

[56] References Cited

U.S. PATENT DOCUMENTS 4,549,295 10/1985 Parvis ........................ 360/53
4,736,352 4/1988 Satoh et al. ................. 369/59

FOREIGN PATENT DOCUMENTS 2022298A 12/1979 United Kingdom .......... 360/48

OTHER PUBLICATIONS

Magnetic Peripherals, Inc., "Preliminary Product Specification for 97704 Intelligent Hydra Drive," Document No. 64401500 (Rev. 1, Mar. 1986), pp. 55–63, 73–74.

Published Technolgy No. 81-1680, Tokyo Shibauro Denki K.K., Shigera Satoke, Apr. 20, 1981.

*Primary Examiner*—Alan Faber
*Assistant Examiner*—Kevin J. Fournier
*Attorney, Agent, or Firm*—Fliesler, Dubb, Meyer & Lovejoy

[57] ABSTRACT

A novel technique for skipping defects on a magnetic or writable optical disk is described. The technique includes a sector format comprising a header (24) and data area (28), wherein the data area can include one or more "bad areas" (108, 116) which will be skipped when data is being written to or read from the sector. The bad areas are variable in size and may be located anywhere in the data area, including in an EDAC. The header includes a defect descriptor (48) comprising a defect pointer (70, 72) for each of the bad areas supported. Each defect pointer contains a value (74, 78) indicating the number of bytes in the good data area (106, 114) preceding the bad area pointed to by the defect pointer, and a value (76, 80) indicating the number of bytes in the bad area. The value indicating the number of bytes in a good area is set to a value indicating a number of bytes at least as large as the sector size if there is no subsequent bad area in the data area.

21 Claims, 3 Drawing Sheets

DEFECT SKIPPING MECHANISM FOR DISK DRIVES

BACKGROUND

1. Field of the Invention

The invention relates to optical and magnetic disks, and more particularly to techniques for avoiding or aocommodating defects on such disks for the storage of data.

2. Background of the Invention

Magnetic disks are frequently used for the storage of data in computer systems. Recently, various types of optical disks have also begun reaching the market. These include read-only disks, write-once disks, as well as full function read/write disks.

A problem common to all disks is that they cannot be manufactured entirely free of defects. That is, no matter how carefully the disk is manufactured, there will always be some portion of the disk on which the data which is read will not be the same as the data which was previously written. Such defects may also arise during use, even if not present immediately after manufacture. This problem is more acute in the relatively young field of optical disks, on which defects are many times more common than they are in the technologically mature field of magnetic disks.

Disks used in computer applications are typically divided into concentric tracks, and each track divided into one or more sectors. If the disk is two-sided, or if multiple platters are rotated simultaneously, then the various concentric tracks of the various surfaces are usually lined up to form concentric cylinders, the tracks of which may be accessed concurrently by different heads. In the case of optical disks, where the spiral recording format has been carried over from the audio applications of such disks, concentric tracks are simulated by placing a marker at the end of each revolution of the spiral track and causing the tracking mechanism to skip inward by one track each time such an index mark is encountered. In this way the gradual outward motion of the tracking mechanism caused by the spiral of the disk is countered once each revolution to maintain the head on the same segment of the spiral through multiple revolutions of the disk.

A disk may either be hard-sectored or soft-sectored. In hard-sectored disks, a hole or other physical index marking is placed on the disk such that it triggers a pulse (called an index pulse) once each revolution. Physical markings are also placed at fixed intervals around the disk, for example at 18° intervals, to indicate the start of each sector in a track. A disk formatted with these physical markings is referred to as being hard-sectored because the sectors cannot be moved to different positions on a track once the disk leaves the manufacturer. However, it should be noted that some types of disks referred to as being hard-sectored are in fact modifiable in the field. The sector marks on these disks constitute a unique pattern laid down on the medium which is readable and modifiable with appropriate circuitry.

Soft-sectored disks also have an index mark to indicate the beginning of each track on the disk. Markings to indicate the beginning of sectors, however, are not fixed in the medium, and are laid down under software control. Additionally, sectors on a soft-sectored disk may be placed at different angular positions on different tracks if desired.

Typically, a sector includes a header area followed by a data area. The header area is preceded by a gap, which is used to permit the disk controller circuitry enough time to prepare to read the header after the beginning of the sector is recognized. The header begins with a VFO region, which the head read circuitry recognizes and uses to set its internal bit-clock frequency. The VFO region is followed by a sync region. The say region contains a code which the disk controller uses to properly divide the incoming stream of bits into bytes. The header then includes an identification section, which usually contains two bytes for the track number, one byte for the head number and one byte for the sector number. The header may include other information as well. Following the header, there is a second gap to allow time for the disk controller to determine whether the sector identification information indicates that this is the desired sector, and time to raise the write signal if information is to be written into the data area of this sector. If the header area includes an error detection code (e.g., a CRC), then this gap also provides the time necessary to determine whether the header contained an error.

The data area in a sector begins with a VFO region and a sync region, which are typically followed immediately by all the data bytes for the sector. An error detection code (EDC) or an error detection and correction code (EDAC) may also be included. A third gap follows the data area, prior to the beginning of the next sector, in order to accommodate variations in the speed of the motor rotating the disk.

A number of different mechanisms have been used in the past to accommodate defects. One technique which is often used when an error is encountered while the disk is in service involves simply rereading the data. A read operation may be attempted three times before a failure is indicated. This techniques sometimes permits recovery of data which would otherwise be considered lost if the defect causing the error is only intermittent in nature (i.e., "soft" defects). The technique provides no improvement if the defect is permanent (i.e., "hard"), however, and is not guaranteed to work even if the defect is intermittent.

In another common mechanism, an error detection and correction code (EDAC) is used in each sector in order to add a measure of redundancy to the information stored in that sector. When the information is written to the disk, a checking code is calculated and written to the disk along with the information. When the information is read back from the disk, a new checking code is calculated and compared with the checking code which Was written to disk with the data. If the two checking codes are identical, then the data is assumed to be accurate. If they are different, then an error exists and an attempt may be made to correct the erroneous data.

This mechanism is effective as far as it goes, and useful on disks which use other defect accommodation techniques as well. The mechanism has a capacity of only a certain number of errors per checking block, however, and it is desirable to reserve that capacity for defects which arise during service after the disk has been formatted or otherwise initialized. It is therefore desirable to use other techniques if a defect is discovered during the formatting stage.

One technique used in the formatting stage for accommodating defects in magnetic or writable optical disks is referred to as sector relocation. In this technique, one or two spare tracks on a disk may be reserved for storing sectors of data which would otherwise encompass a defect. In a typical formatting operation, a sector is repeatedly written with data, read and compared to the original. If less than a certain number of errors appear, the sector is considered good and error management is left to EDAC techniques. Otherwise, the sector is considered bad and marked as such. A pointer is also written into the header portion of the bad sector pointing to the spare track, such that the head will move to the same sector on the spare track whenever a read from, or write to the bad sector is encountered.

An important problem with the sector relocation technique is that the error which is causing the sector to be considered bad may be due to only a few bad bytes. This is a fairly common occurrence on magnetic disks and even more common on optical disks. Thus an entire sector of data may be wasted for only a few bad bytes. Another problem with this technique arises because files are frequently stored on disk in sequential sectors. If a sector is relocated because the normally sequential sector contains a defect, a time penalty is paid whenever the entire file is being read out.

Another technique used in the formatting stage is known as sector sparing. This technique is similar to the sector relocation technique, except that the spare sectors are located at the end of each track instead of on a separate spare track. The sector sparing technique has the same deficiencies as the sector relocation technique.

In yet another technique for accommodating defects on a disk, available for soft-sectored disks only, data is first written onto a track and then read back to determine the location of any defects. Sector marks, headers and data regions are then written onto the track in such a way that all the discovered defects are located in gap areas. This technique provides an improvement over the sector relocation and sector sparing techniques, but it is still not optimum. For example, if a defect is discovered toward the end of what would otherwise be a data area, the gap area which precedes the data area would have to be extended nearly to the size of a data area (e.g., 1K bytes) in order to use this technique.

Yet another technique for accommodating defects on a disk is set forth in an engineering specification by Magnetic Peripherals, Inc. Under this specification, a sector may be in either a 4K format or a 16K format. In the 4K format, the header contains information permitting the controller to skip over a fixed size 96-byte area of the media centered over the defect. The defect can be as large as 64 bytes before it is considered unmanageable with this technique and relegated to other defeot management techniques. In the 16K format, two skips in a single data area are accommodated. These two skips may be concatenated to form a single 160-byte skip. The header for each sector contains a flag word which indicates whether the data area contains 0, 1 or, in the case of the 16K format, 2 skips. The header also includes one or two 2-byte defect pointers. If the data area contains a defect, then the first defect pointer contains the size, in bytes, from the beginning of the data segment to the beginning of the first skip. If the sector is in 4K format, then the data resumes immediately after the 96-byte skip and continues until the end of the data area. If the sector is in 16K format and the flag word indicates that the data area contains a second defect, then the second defect pointer contains the number of bytes between the first skip and the second skip. Reading of data resumes immediately after the second skip and continues until the end of the data area.

The technique described in the engineering specification can be more flexible than any of the previously described techniques, but it still has deficiencies. First, since the defect skip is always 96 bytes. 96 bytes will always be lost even if the defect is much smaller. In order to understand the second deficiency, it is useful to note that disk controllers typically include match logic for determining whether the sector then being read from the disk is the sector desired by the controller. As the sector identification information is read from the header, it is compared by the match logic, byte by byte, with stored information identifying the desired sector. If this same match logic is also required to test the flag words (which are also in the header) as they arrive, in order to determine which, if any, of the defect pointers contain valid information, then the match logic can become extremely complex. Such complexity is a serious problem at the rates at which data arrives from the disk. Data rates are extremely quick, requiring that the match logic be as simple as possible.

SUMMARY OF THE INVENTION

It is therefore an object of the present invention to provide a technique for defect management which alleviates some or all of the above problems.

It is another object of the present invention to provide a disk having a sector format which permits skipping over defects in the data area with minimum overhead.

It is another object of the present invention to provide a method of initializing a disk using an improved defect management mechanism.

It is another object of the present invention to provide a method of reading a disk which incorporates an improved defect management technique.

The above objects and others are accomplished according to the invention by using a disk format in which each sector includes a header and a data area, wherein the data area can include one or more defects. The header includes a defect descriptor which specifies, for each defect in the data area, the size of the good area preceding a "bad area" covering the defect, and the size of the bad area. The bad areas are thus variable in size and may be located anywhere in the data area. If the data area does not contain any defects, then the portion of the defect descriptor indicating the number of good bytes which precede the first bad area is set to a number of bytes at least as large as the sector size.

Unless otherwise specified, as used herein, the sector size is the number of good bytes in the data area of a sector, including EDAC.

When a sector is to be read from the disk, the values specified in the defect descriptor are first stored in registers in a disk controller. Bytes of data are then read from the data area, while keeping track of the number of bytes read. If the number of bytes read reaches the sector size, then the data area contained no defect and the read operation is complete. If the number of bytes read reaches the size of the first good area before it reaches the sector size, then reading continues in the first bad area, and the data is discarded until the number of bad bytes read reaches the size of the first bad area. If the defect descriptor supports a second bad area, then reading of data bytes continues from a second good area until either (1) the total number of good bytes read (from both the first good area and the second good area)

reaches the sector size, in which case the read operation is completed, or (2) the number of bytes specified in the defect descriptor for the second good area is reached, in which case the controller then proceeds to read and discard bytes from the second bad area. The process continues until the read head is beyond the last bad area supported by the defect descriptor. Good data is then read until the end of the data area.

It can be seen that not only does this technique provide the flexibility of variable length bad areas to cover small or large defects, but it is also simple to implement since it does not require any testing of flags to determine whether or how many defects will be skipped. The same hardware apparatus may be used regardless of the number of skips, up to the total number supported by the defect descriptor.

DETAILED DESCRIPTION

Figures 1A, 1B:
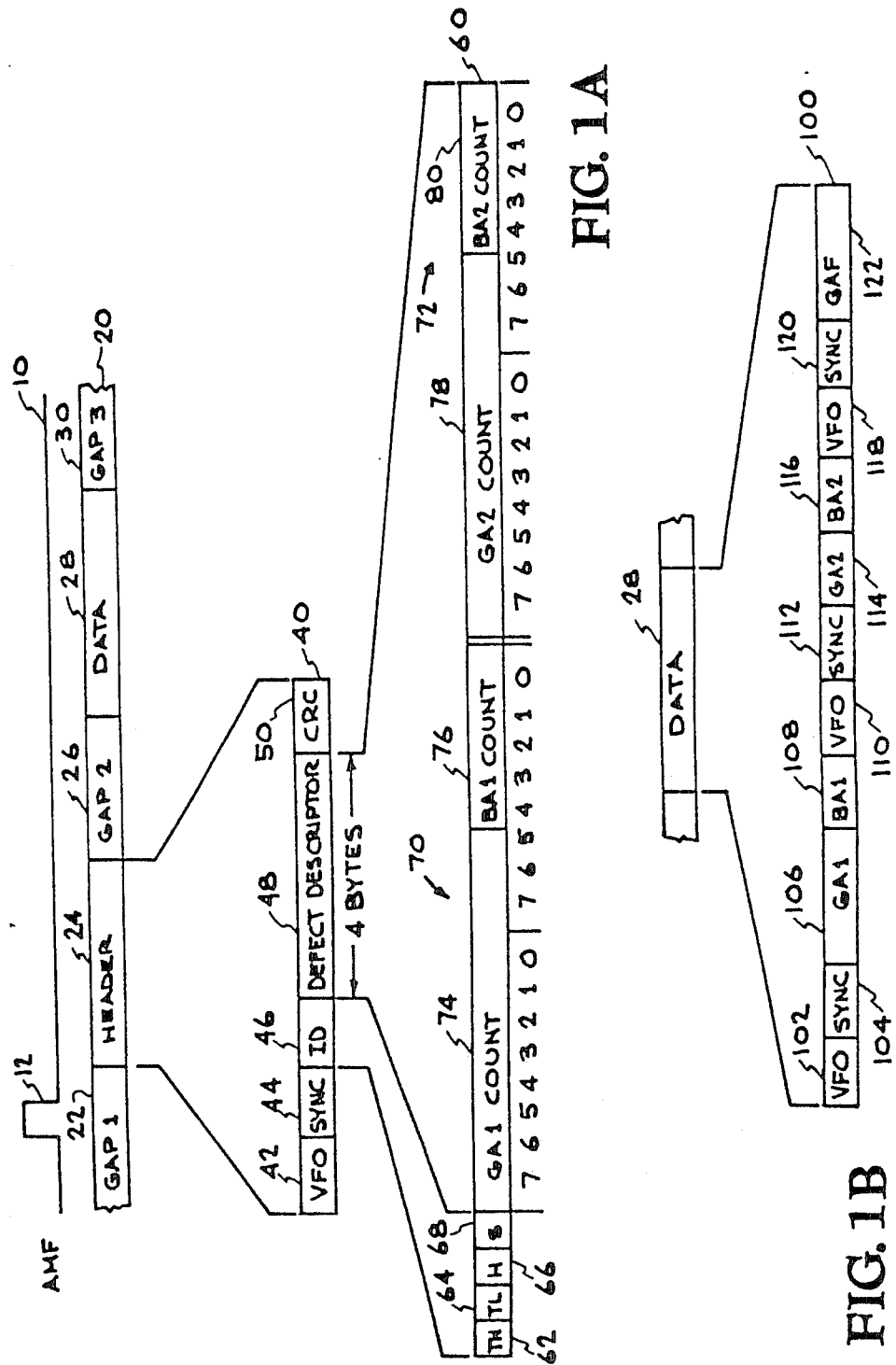
FIGS. 1a and 1b show the organization of a sector on a disk initialize-d according to the invention.

In FIGS. 1a and 1b, there is shown a representation of the format of a sector having an improved defect management mehanism according to the invention. At the top of FIG. 1a, there is shown an AMF waveform 10. It includes an AMF (Address Mark Found) pulse 12, indicating the start of the sector which is represented in FIFS. 1a and 1b. On a hard-sectored disk the AMF pulse would be replaced by a sector pulse generated by a sector start hole or other permanent or semipermanent marking.

The portion of the track on the disk which contains the sector to be described is shown in FIG. 1a as strip 20. It begins with a GAP 1 area 22, which should be under the read head when the AMF pulse 12 is received. GAP area 22 is followed by a HEADER area 24, beginning shortly after the AMF pulse 12. The HEADER area 24 is followed by a GAP 2 area 26 which is in turn followed by a DATA area 28. The sector size in the present embodiment is 1K bytes, so DATA area 28 is made large enough to accommodate all 1K bytes, as well as an EDAC, exclusively in good areas. The DATA area 28 is followed by a GAP 3 area 30, which continues until the beginning of the next sector. The purposes of GAP 1 area 22, GAP 2 area 26 and GAP 3 area 30 are the same as those described above with respect to related art.

Strip 40 shows a detail of HEADER area 24. It begins with a VFO area 42 followed by a SYNC area 44. These two areas provide the information and timing necessary for head read circuitry to set its clock frequency in accordance with the speed at which data will be arriving from the disk. SYNC area 44 is followed by an ID area 46, which contains 4 bytes of information. As shown in strip 60 below strip 40, the four bytes are TH byte 62, TL byte 64, H byte 66 and S byte 68. Respectively, they represent the high-order portion of the track number, the low-order portion of the track number, the head number and the sector number within the track.

The ID area 46 is followed by a defect descriptor 48 which is described in more detail below. The defect descriptor 48 is followed by a CRC area 50. The CRC area 50 provides error detection capability covering ID area 46 and DEFECT DESCRIPTOR area 48, and does not provide any error correction capability.

Strip 60 shows in more detail the ID area 46 and the DEFECT DESCRIPTOR area 48. The contents of ID area 46 are described above. DEFECT DESCRIPTOR area 48 includes two 2-byte defect pointers 70 and 72. The defect pointer 70 is divided into a GA1 COUNT area 74 occupying the high-order 11 bits and a BA1 COUNT area 76 occupying the low-order 5 bits. The 2-byte defect pointer 72 is similarly divided into a GA2 COUNT region 78 occupying the high-order 11 bits and a BA2 COUNT region 80 occupying the low-order 5 bits.

In FIG. 1b there is shown a strip 100 which shows in more detail the DATA area 28 shown on strip 20 in FIG. 1a. The detail shown assumes that the DATA area 28 includes two defects numbered 1 and 2 (not shown). The DATA area 28 begins with VFO area 102 and a SYNC area 104, the purpose of which areas are the same as that of VFO area 42 and SYNC area 44 shown in FIG. 1a. SYNC area 104 is followed by a GA1 area 106 having the number of bytes of data which is specified by GA1 COUNT area 74 shown in FIG. 1a. GA1 area 106 is known as the first "good area" in the DATA area 28. It is followed by a BA1 area 108, containing the number of bytes specified in BA1 COUNT area 76. BA1 area 108 is the first "bad area", and the first defect occurs within this area. Down to the limit of the granularity by which the values in GA1 COUNT area 74 and BA1 COUNT area 76 speoify numbers of bytes (illustratively, these values may specify numbers of bytes in 4-byte increments), BA1 area 108 need not be any larger than the defect it covers.

BA1 area 108 is followed in the DATA area 28 by another VFO area 110 and SYNC area 112, which are in turn followed by a GA2 area 114. The GA2 area 114 is the second "good area" in the DATA area and contains the number of bytes specified by the value in GA2 COUNT area 78. GA2 area 114 is followed by the second "bad area", BA2 area 116, which covers the second defect and which contains the number of bytes specified by the value in BA2 COUNT area 80.

Following BA2 area 116 is another VFO area 118 and SYNC area 120, followed further by a final "good area", GAF area 122. GAF area 122 contains the number of bytes required to bring the total number of bytes in good areas in the DATA area 28 (including GA1 area 106, GA2 area 114 and GAF area 122) up to the sector size. The DATA area 28 also includes an EDAC area (not shown), which provides error detection and correction for all three good areas in the DATA area 28. The EDAC area usually follows the user's data, but since the inventive mechanism can accommodate defects in the EDAC area as well as in the user's data, the EDAC may be entirely in GAF area 122, or split between GA2 area 114 and GAF area 122, or split between all three good areas.

If the DATA area 28 contained only one defect, then BA2 area 116, VFO area 118, SYNC area 120 and GAF area 122 would be omitted. The absence of the second bad area and the final good area would be indicated in the defect descriptor 48 by placing a value in GA2 COUNT area 78 which specifies a large number of bytes, e.g. 2048. As will be seen, a fixed number at least as large as the sector size is easiest, but any number at least as large as the sector size minus the number of bytes specified by the value in GA1 COUNT area 74 would operate properly.

If the DATA area 28 contains no defects, then all the areas in DATA area 28 from BA1 area 108 to GAF area 122, inclusive, would be omitted. This would be indicated in the defect descriptor 48 by placing a value in GA1 COUNT area 74 which is at least as large as the sector size.

It can be seen that the sector format shown in FIGS. 1a and 1b can accommodate up to two defects in the data area of each sector. The supported number of defects can be increased or decreased as desired, by including, respectively, more or less than two 2-byte defect pointers such as 70 or 72 in the defect descriptor 48. A larger number of such defect pointers can support more defects in the DATA area 28 before the sector is declared unmanageable by this technique and relegated to other defect management techniques. On the other hand, the enlarged defect descriptor is itself additional overhead, and also reduces the effectiveness of error detection provided by CRC area 50. For sector sizes of 2K bytes or less, plus EDAC, support for two defects has been found optimum.

The values in GA1 COUNT area 74, BA1 COUNT area 76, GA2 COUNT area 78 and BA2 COUNT area 80 specify numbers of bytes in multiples of four. A zero value indicates 4 bytes. Thus, these values are equal to $n/4-1$, where n is the number of bytes specified by the value. The BA1 and BA2 COUNT areas 76 and 80 are each 5 bits wide, so they can each contain values specifying up to 128 bytes. If a defect is larger than 128 bytes, it is declared unmanageable by the presently described embodiment of the invention and resort is had to other defect management techniques. GA1 and GA2 COUNT areas 74 and 78 are each 11 bits wide, and can therefore store values representing numbers of bytes up to 8192 (8K). This is much larger than the sector size of 1K bytes plus EDAC, but allowing for representation of up to 8K bytes permits retention of the header format shown in FIG. 1a as a standard for any sector size up to 8K.

In a variation of the embodiment shown in FIGS. 1a and 1b, a single defect larger than 128 bytes may be accommodated if the DATA area does not contain a second defect. In this variation, when such a large defect is encountered on initialization of the disk, a particular predefined code, one which will not be confused with a byte count, may be written into GA2 COUNT area 78. Such a code may be one of the available values indicating a byte count larger than the sector size, or it may be "0" if "0" is otherwise made illegal in this field. The value indicating the size of the bad area is then considered to be 10 bits wide: the high-order 5 bits are placed in BA1 COUNT area 76 and the low-order 5 bits are placed in BA2 COUNT area 80. When data is to be read from or written to the sector, the disk controller recognizes the predefined code in GA2 COUNT area 78 and concatenates the values in BA1 COUNT area 76 and BA2 COUNT area 80 in order to calculate the number of bytes to discard when the bad area in the DATA area 28 begins. A single defect of up to 4K bytes could be accommodated using this variation. Many other variations will be apparent.

The method by which a sector data read or write operation is performed on a disk formatted as shown in FIGS. 1a and 1b will now be described with reference to FIG. 2. A sector data read operation will be described for simplicity but it will be understood that a similar procedure may be used for a sector data write operation. The method divides essentially into four sections, namely set-up section 202; first good and bad read section 204; second good and bad read section 206 and final good read section 208.

In the set-up section 202, the disk controller first awaits an AMF pulse such as 12 (FIG. 1a). This occurs in a step 210. In steps 212 and 214, the ID area 46 is read and compared byte-by-byte to stored ID information describing the desired sector. If the sector ID information does not match that of the desired sector, control returns to step 210 and the test is repeated for the next sector. If the sector ID information does match that of the desired sector, control continues in step 216. In this step, the defect descriptor 48 is read. The values read from GA1 COUNT area 74, BA1 COUNT area 76, GA2 COUNT area 78 and BA2 COUNT area 80 are stored respectively in a GAI COUNT register, a BA1 COUNT register, a GA2 COUNT register and a BA2 COUNT register (not shown). Also in step 216, the sector size is loaded into an SS register (not shown). It can be seen that no unusually complicated match logic is required because there are no flags to test to determine whether any defects will be skipped when the data area is read. A simple byte-by-byte bit level comparator, with an equality output signal, will suffice.

In the first good and bad read section 204, the head read circuitry is first resynchronized with the clock frequency of the data to be arriving from disk. (Step 220). In step 222, the first good byte of data is read from GA1 area 106 and the GA1 COUNT and SS COUNT stored in the disk controller are both decremented by 1. In a step 224, the value in the SS register is tested for 0 and the procedure terminated if the test is positive. Since we are still reading from GA1 area 106, this can occur only if the DATA area 28 contained no defects.

In a step 226, the new GAI COUNT is tested for 0, and control returned to step 222 to read the next good byte of data if the test was negative. If the test was positive, then all the good bytes in GA1 area 106 have been read and the head is entering the first bad area, BA1 area 108. In a step 230, the first bad byte in BA1 area 108 is read and discarded. The BA1 COUNT is decremented and is tested for 0 in a step 232, and control is returned to step 230 if the result is negative. In step 230, the next bad byte is read from BA1 area 108 and the BA1 count decremented again. If the test in step 232 was positive, then the skip over the first defect is complete and the procedure continues with the second good and bad area read section 206.

In the second good and bad area read section 206, the head read circuitry is again resynchronized with the clock of the incoming data in a step 240. This is desirable because the waveform generated by the read head as it traverses a bad area is unreliable not only in the data it represents, but also in the location and the timing of clock pulses. Resynchronization is desirable in case the head read circuitry lost the proper clock frequency.

The remainder of second good and bad area read section 206 is similar to that of first good and bad read area section 204. In step 242, a byte is read from GA2 area 114 and stored. The value in the SS register and the GA2 COUNT are both decremented. The value in the SS register is tested for 0 in step 244, and the routine terminated if the test is positive. If negative, then the GA2 COUNT is tested for 0 and, if the result is negative, control is returned to step 242 in order to read the next good byte from GA2 area 114. If the result of the test in step 246 is positive, then all the good bytes in GA2 area 114 have been read and the head is beginning to read bad bytes from BA2 area 116. In step 250, the first bad byte from BA2 area 116 is read and discarded, and the BA2 COUNT value is decremented. If the BA2 COUNT has not yet reached 0 (step 252), then control is returned again to step 250 to read and discard the next bad byte from BA2 area 116.

If the result of the test in step 252 is positive, meaning the skip over the second defect in the DATA area 2B is complete, then the procedure enters the final good area read section 208. Resynchronization is first performed in a step 260, for the same reason that resynchronization was performed in step 240. Steps 262 and 264 then iteratively read good bytes from the GAF area 122 and decrement the value in the SS register correspondingly, until the value in the SS register reaches 0. When it does, then all the good bytes in GAF area 122 have been read and the procedure terminates. The disk controller may subsequently perform an error correction operation on all the good data read from GA1 area 106, GA2 area 114 and GAF area 122, using the code in the EDAC area (not shown).

Figure 2:
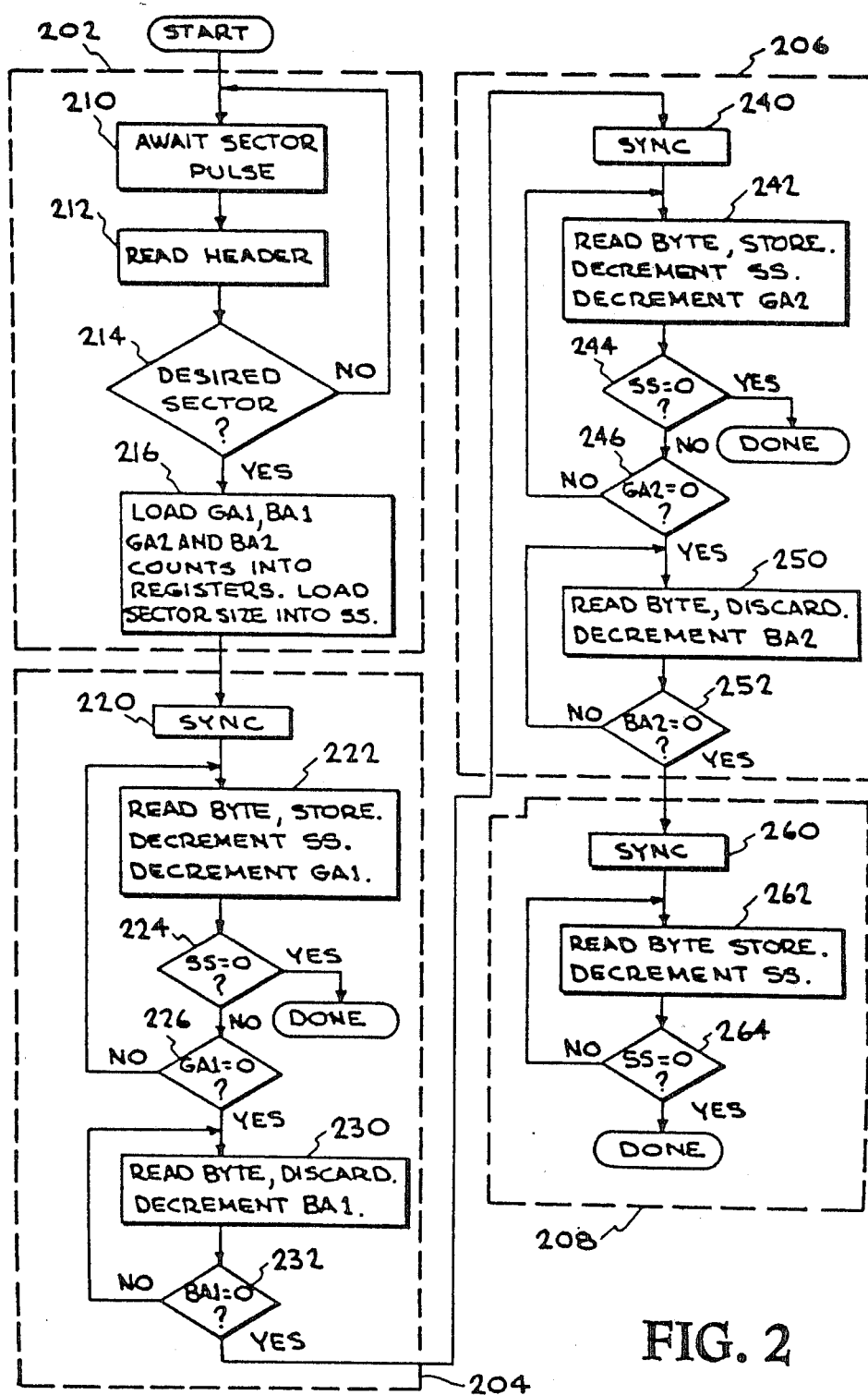
FIG. 2 is a flowchart showing a process for reading data from a sector on a disk initialized according to the invention.

As previously mentioned, the method of FIG. 2 may be used for a sector write data operation with only minor modifications. In particular, the reading and storing of bytes from the first good area, set forth in step 222, would be changed to a step of writing bytes to the current head position in the first good area. Similarly, the reading and storing of bytes set forth in step 242 would be changed to a step of writing bytes into the second good area. The step of reading and storing bytes from the final good area, set forth in step 262, would also be changed to a step of writing bytes into the final good area.

It can be seen that the above procedure for reading and writing bytes of data into the data area of a sector formatted according to the invention is relatively simple and easy to implement. It may be implemented using a state machine, and such an implementation is preferred due to its high speed. A microcode implementation, however, would also be possible.

Figure 3:
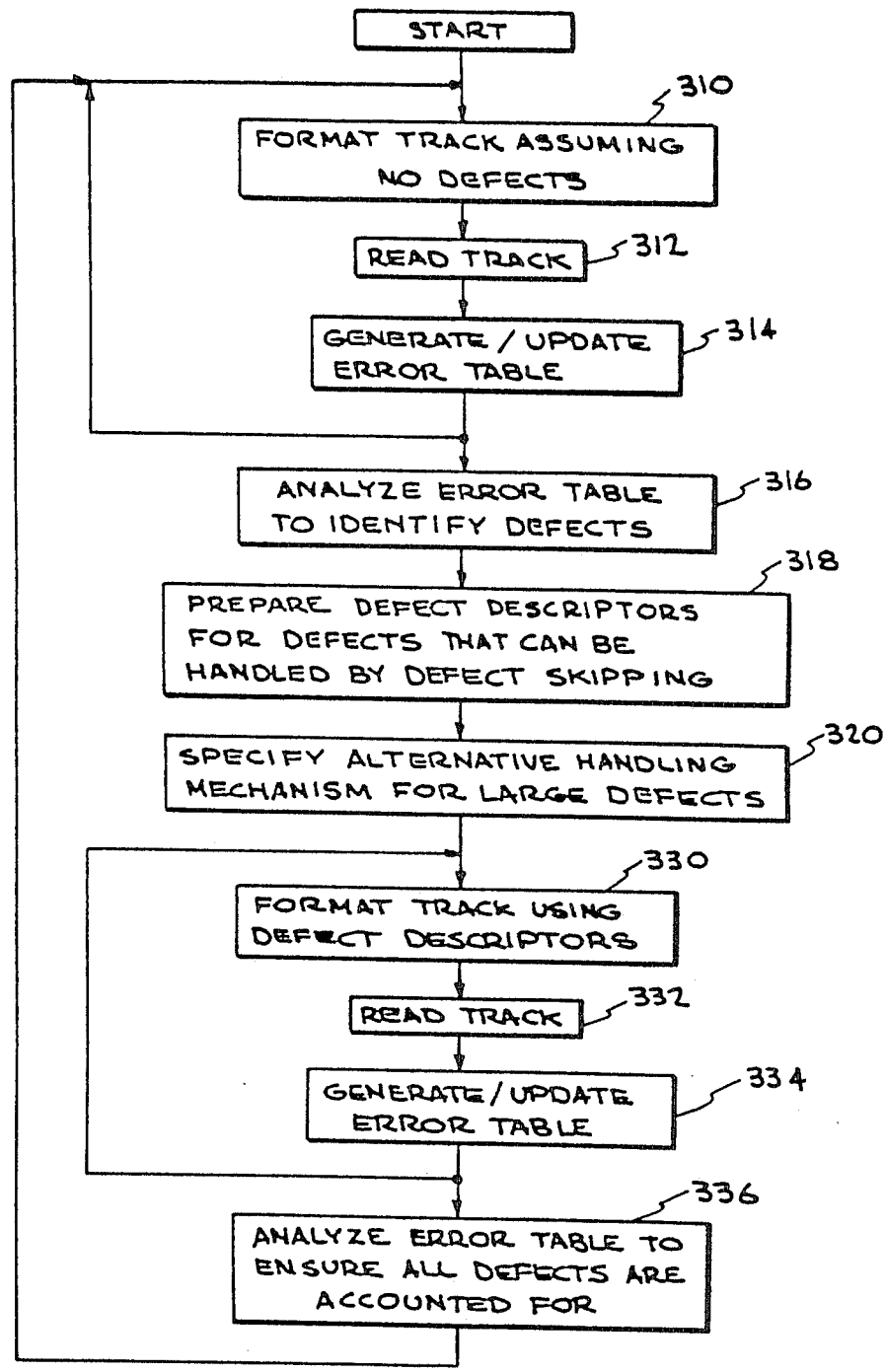
FIG. 3 is a flowchart showing a process for initializing a disk according to the invention.

A method by which a disk may be initialized using the invention will now be described with reference to FIG. 3. Basically, it involves determining the location and size of defects on a track on the disk, and then formatting the track using the header format shown in FIG. 1a.

In a step 310, the track is formatted assuming there are no defects. That is, values are placed into GA1 count area 74 for each sector, which values are at least as large as the sector size, and the data areas are formatted as 1104 contiguous bytes (assuming a sector size accommodating 1K bytes of data and 80 bytes of EDAC). The GAP3 area 30 for each sector is made large enough to allow for extension of the data area 28 to accommodate defects. Known information is written onto all areas of the track.

In a step 312 the information is read back from the track. It is compared to the information that was written to the track in step 314, and a table (not shown) is generated to indicate which bytes on the track have provided erroneous information on read.

Steps 310-314 are repeated a predetermined number of times, for example ten times, the error table being updated after each repetition to finally indicate the number of times an error was detected for each byte on the track. The error table is then analyzed in a step 316 to identify hard defects on the medium. A hard defect in the medium will usually show up as an error virtually every time this test is performed. A soft defect will usually show up as an error only 10%-20% of the repetitions. In a step 318 it is determined whether each given defect is manageable using the inventive technique, and if so, the appropriate defect descriptors are prepared. If a defect cannot be managed using the inventive technique, then alternative handling mechanisms are specified (step 320). This may be the case if the defect is too large, if the data area contains more than the number of defects supported by the defect descriptor portion of the header, if the defect occurs in a header area, or if the defect includes the beginning of a data area. In the last case the formula used to calculate the value to be placed in GA1 count area 74 would yield an invalid number. Prior art gap extension techniques or sector relocation techniques accommodate these types of defects.

Once the defect descriptors have been prepared, the track is formatted once again, this time using the defect descriptors (step 330). The track is then read back (step 332) and a new error table generated (step 334). Steps 330 through 334 are repeated a predetermined number of times, the error table being updated in step 334 each repetition until the error table finally contains values indicating the number of errors detected in each byte in each sector. This error table is analyzed in step 336 to ensure that all hard defects have been accounted for. If they have not, or if additional assurance is desired, then the entire procedure may be repeated any number of times. The formatting step 310 may be omitted during the second and subsequent repetitions of the procedure if desired, to ensure that each repetition yields a formatted track which is at least as good as the previous repetition.

It should be noted that the error table need not maintain error counts to a granularity as fine as one byte. In fact, it would not be worthwhile to maintain such error counts with any granularity finer than that which will be used in the defect descriptors (e.g., a granularity of four bytes). That is, each location in the table refers to a block of four bytes, and any error that appears in any of the four bytes increments the tally in that location in table. The formatting process can be further simplified by defining the table with a granularity which is still coarser than that of the defect descriptor (e.g., 12-byte blocks).

In a variation of the above embodiment, the steps 314 and 334 could be performed not by comparing the data read from the disk byte by byte with the data originally written to the disk, but instead by utilizing the EDAC to pinpoint the bytes which contained errors. This may simplify the disk controller apparatus, or the software routine which supervises the initialization operation, but it reduces the accuracy of the result since the EDAC is incapable of pointing out the locations of more than a certain number of erroneous bytes.

It should be noted further that, though step 310 may format the track using the same sector size which will be used when the disk is in normal use, e.g., 1K bytes plus EDAC, the reading step 312 need not read the track in the same way. In particular, it may be desirable to read the track as two very long sectors of, for example, 5,000 bytes each. This would permit detection of defects in header areas and gap areas as well as data areas. It is useful to detect defects especially in the GAP3 area 30 of each sector, since that area will become occupied if the immediately preceding data area needs to be extended to accommodate a defect in such data area.

It will be understood that the above-described embodiment is merely illustrative of many specific embodiments which can represent the principles of the invention. Numerous and varied other arrangements can readily be devised in accordance with these principles without departing from the spirit and the scope of the invention. As one example, the use of the inventive technique need not supersede other defect management techniques, even in the same sector, which do not conflict. To accommodate defects in the header, for instance, the disk sector format may specify a second, duplicate copy of the header which will be read if the first copy of the header is unrecoverable. Thus, the foregoing description is not intended to limit the invention which is defined by the appended claims.

We claim:

1. A disk having improved defect management, the disk having a track on a data surface, the track having a sector (20) which includes a first header area (24) and a data area (28) following the first header area, the data area potentially containing a first discovered defect, the first header area including a defect descriptor (48) which comprises:
   means (74) for representing a first value indicating the ending position in the sector of a first good area (106) of data; and
   means (76) for representing a second value indicating, if the data area contains the first defect, the ending position in the sector of a first variable length bad area (108) immediately following the first good area and containing the first defect.

2. A disk according to claim 1, wherein the sector includes a second header area between the first header area and the data area, the second header area also including the defect descriptor.

3. A disk according to claim 1, wherein the first value indicates the number of bytes in the first good area and the second value indicates the number of bytes sin the first bad area.

4. A disk according to claim 3, wherein the first value is g/4−1, where g is the number of bytes in the first good area, and wherein the second value is b/4−1, where b is the number of bytes in the first bad area.

5. A disk according to claim 1, wherein the first value is a given function of the number of bytes in the first good area if the data area contains the first defect or the given function of a number of bytes at least as large as the sector size if the data area does not contain the first defect.

6. A disk according to claim 1, wherein the data area potentially contains a second discovered defect following the first defect and wherein the defect descriptor further comprises:
   means (78) for representing a third value indicating, if the data area contains the first defect, the ending position in the sector of a second good (114) area of data following the first bad area; and
   means (80) for representing a fourth value indicating, if the data area contains both the first defect and the second defect, the ending position in the sector of a second variable length bad area (116) immediately following the second good area and containing the second defect.

7. A disk according to claim 6,
   wherein the first value is a given function of the number of bytes in the first good area if the data area contains the first defect, or the given function of a number of bytes at least as large as the sector size if the data area does not contain any defect;
   wherein the second value is the given function of the number of bytes in the first bad area if the data area contains the first defect;
   wherein the third value is the given function of the number of bytes in the second good area if the data area contains both the first defect and the second defect, or the given function of a number of bytes at least as large as the sector size minus the number of bytes in the first good area if the data area contains the first defect but does not contain the second defect; and
   wherein the fourth value is the given function of the number of bytes in the second bad area if the data area contains both the first defect and the second defect.

8. A disk according to claim 6,
   wherein the first value is a given function of the number of bytes in the first good area if the data area contains the first defect, or the given function of a number of bytes as least as large as the sector size if the data area does not contain any defect;
   wherein the second value is the given function of the number of bytes in the first bad area if the data area contains the first defect and the first bad area is smaller than a predetermined size;
   wherein the third value is (a) the given function of the number of bytes in the second good area if the data area contains both the first defect and the second defect, (b) the given function of a number of bytes at least as large as the sector size minus the number of bytes in the first good area if the data area contains the first defect but does not contain the second defect and the first bad area is smaller than the predetermined size, or (c) a predetermined code if the data area contains the first defect but does not contain the second defect and the first bad area is at least as large as the predetermined size;
   wherein the fourth value is the given function of the number of bytes in the second bad area if the data area contains both the first defect and the second defect; and
   wherein, if the data area contains the first defect but does not contain the second defect and the first bad area is at least as large as the predetermined size, the second value and the fourth value in combination yield a value equal to the given function of the number of bytes in the first bad area.

9. A disk according to claim 1, wherein the first header area further includes means (50) for representing an error checking code covering only bits in the first header area.

10. A disk according to claim 1, further comprising, if the data area contains the first defect, a synchronization mark (112) following the first bad area in the data area.

11. A disk having improved defect management, the disk having a track on a data surface, the track having a sector (20) which includes a header area (24) and a data area (28) following the header area, the header area including a defect descriptor (48) which comprises:
   a GA1 count area (74) containing a value indicating the number of bytes existing in a first good area (106) in the data area;
   a BA1 count area (76) containing a value indicating the number of bytes existing in a first variable length bad area (108), if such a first bad area exists, immediately following the first good area in the data area;

a GA2 count area (78) containing a value indicating the number of bytes existing in a second good area (114), if such a second good area exists, following the first bad area in the data area; and a BA2 count area (80) containing a value indicating the number of bytes existing in a second variable length bad area (116), if such a second bad area exists, immediately following the second good area in the data area.

12. A disk according to claim 11, wherein the values in the GA1 count area, the BA1 count area, the GA2 count area, and the BA2 count area indicate numbers of bytes in multiples of four.

13. A disk according to claim 11, wherein, if the data area contains a discovered defect, the value in the GA1 count area is $g_1/4-1$, the value in the BA1 count area is $b_1/4-1$, the value in the GA2 count area is $g_2/4-1$ and the value in the BA2 count area is $b_2/4-1$, where $g_1$ is the number of bytes in the first good area, $b_1$ is the number of bytes in the first bad area, $g_2$ is the number of bytes in the second good area, and $b_2$ is the number of bytes in the second bad area; and if the data area does not include any discovered defect, the value in the GA1 count area is at least as large as $s/4-1$, where s is the sector size.

14. A disk according to claim 12,
wherein the GA1 count area occupies the high-order 11 bits of a first 2-byte defect pointer (70) in the defect descriptor,
wherein the BA1 count area occupies the low-order 5 bits of the first defect pointer in the defect descriptor,
wherein the GA2 count area occupies the high-order 11 bits of a second 2-byte defect pointer (72) in the defect descriptor, and
wherein the BA2 count area occupies the low-order 5 bits of the second defect pointer in the defect descriptor.

15. A disk having improved defect management, the disk having a track on a data surface, the track having a sector (20) which includes a header area (24) and a data area (28) following the header area, the data area comprising in sequence:

a first synchronization region (104);
a first good area (106);
a first bad area (108) containing a first discovered defect, if the data area contains such a first discovered defect, the first bad area immediately following the first good area;
a second synchronization region (112), if the data area contains the first discovered defect;
a second good area (114), if the data area contains the first discovered defect;
a second bad area (116) containing a second discovered defect, if the data area contains both the first discovered defect and the second discovered defect, the second bad area immediately following the second good area;
a third synchronization region (120), if the data area contains both the first discovered defect and the second discovered defect; and
a third good area (122), if the data area contains both the first discovered defect and the second discovered defect;
wherein the header area includes a defect descriptor (48) which comprises:

a first 2-byte defect pointer (70), the high-order 11 bits (74) of the first 2-byte defect pointer containing a value $g_1/4-1$ and the low-order 5 bits (76) of the first 2-byte defect pointer containing a value of $b_1/4-1$, $g_1$ being the number of bytes in the first good area if the data area contains the first discovered defect, or number at least as large as the sector size if the data area does not contain any discovered defect, $b_1$ being the number of bytes in the first bad area if the data area contains the first discovered defect: and a second 2-byte defect pointer (72) following the first 2-byte defect pointer, the high-order 11 bits (78) of the second 2-byte defect pointer containing a value $g_2/4-1$ and the low-order 5 bits (80) of the second 2-byte defect pointer containing a value $b_2/4-1$, $g_2$ being the number of bytes in the second good area if the data area contains the second discovered defect, or a value at least as large as the sector size minus the number of bytes in the first good area if the data area does not include the second discovered defect, $b_2$ being the number of bytes in the second bad area if the data area contains the second discovered defect;

the header area further including an error checking code (50) covering at least the bits in the defect descriptor, and covering no bits outside the header area.

16. A method for reading data from a sector (20) on a track on a disk, the sector including a data area (28), comprising in sequence the steps of:

reading (216) from the disk a value indicating the number of bytes of data which exist in a first good area (106) in the data area and, if the data area includes a first bad area (108) following the first good area, a value indicating the number of bytes which exist in the first bad area;

iteratively reading (222, 224, 226) first good bytes of data from the first good area, the step of iteratively reading first good bytes terminating when the number of first good bytes read reaches the sector size or the number of good bytes in the first good area, whichever is smaller;

terminating (224) the method if the number of first good bytes read equals or exceeds the sector size;

iteratively reading (230, 232) first bad bytes of data from the first bad area, the step of iteratively reading first bad bytes terminating when the number of first bad bytes read reaches the number of bad bytes in the first bad area; and iteratively reading (262, 264) final good bytes of data from a final good area (122) following the first bad area, the step of reading final good bytes terminating when the total number of good bytes read from the data area reaches the sector size.

17. A method according to claim 16, further comprising:

the step of reading (216) from the disk a value indicating the number of bytes of data which exist in a second good area (114) in the data area and, if the data area includes a second bad area (116) following the second good area, a value indicating the number of bytes which exist in the second bad area;

and between the step of iteratively reading first bad bytes and the step of iteratively reading final good bytes, the steps of:

iteratively reading (242, 244, 246) second good bytes of data from the second good area, the step of iteratively reading second good bytes terminating when the total number of good bytes read reaches the sector size or when the number of second good bytes read reaches the number of good bytes in the second good area, whichever occurs first;

terminating the method if the total number of good bytes read equals or exceeds the sector size; and iteratively reading (250, 252) second bad bytes of data from the second bad area, the step of iteratively reading second bad bytes terminating when the number of second bad bytes read reaches the number of bad bytes in the second bad area.

18. A method according to claim 16, further comprising the step (260) of resynchronizing head read circuitry prior to the step of iteratively reading final good bytes.

19. A method according to claim 16, further comprising, between the step of reading from the disk and the step of iteratively reading first good bytes, the step of storing (216) as a GA1 value a value indicating either the number of bytes in the first good area if the data area includes a first bad area or a number of bytes at least as large as the sector size if the data area does not include a first bad area, and if the data area includes a first bad area, the step (216) of storing as a BA value a value indicating the number of bytes in the first bad area; and prior to the step of reading first good bytes, the step (216) of storing as an SS value a value indicating the sector size;

wherein the step of iteratively reading first good bytes comprises the step of iteratively decrementing (222) the GA1 value and the SS value in accordance with the number of first good bytes read and terminating (224, 226) the step of iteratively reading first good bytes when the GAI value or the SS value reaches 0, whichever occurs first;

wherein the step of iteratively reading first bad bytes comprises the step of iteratively decrementing (230) the BA1 value in accordance with the number of first bad bytes read and terminating (232) the step of iteratively reading first bad bytes when the BA1 value reaches 0; and wherein the step of iteratively reading final good bytes comprises the step of iteratively decrementing (262) the SS value in accordance with the number of final good bytes read and terminating (264) the method when the SS value reaches 0.

20. A method of initializing a disk, comprising the steps of:

determining (310, 312, 314, 316) whether the disk contains a first defect, and, if so, the location and size of such first defect;

writing (330) into the header area (24) of a sector (20) containing the first defect a first value indicating the ending position in the sector of a first good area (106) of data; and writing (330) into the header area a second value indicating the ending position in the sector of a first variable length bad area (108) containing the first defect.

21. A method according to claim 20, further comprising the steps of:

determining (310, 312, 314, 316) whether the disk contains a second defect following the first defect in the same sector as the first defect, and, if so, the location and size of such second defect;

writing (330) into the header area of the sector a third value indicating the ending position in the sector of a second good area (114) of data; and writing (330) into the header area a fourth value indicating the ending position in the sector of a second bad area (116) containing the second defect.

* * * * *